US011974085B2

(12) United States Patent
Sui

(10) Patent No.: US 11,974,085 B2
(45) Date of Patent: Apr. 30, 2024

(54) CONTROL METHOD AND CIRCUIT FOR EARPHONE, AND SMART WRIST WORN DEVICE

(71) Applicant: GOERTEK INC., Shandong (CN)

(72) Inventor: Tao Sui, Shandong (CN)

(73) Assignee: GOERTEK INC., Shandong (CN)

( * ) Notice: Subject to any disclaimer, the term of this patent is extended or adjusted under 35 U.S.C. 154(b) by 232 days.

(21) Appl. No.: 17/594,166

(22) PCT Filed: Sep. 25, 2019

(86) PCT No.: PCT/CN2019/107898
§ 371 (c)(1),
(2) Date: Oct. 5, 2021

(87) PCT Pub. No.: WO2021/031291
PCT Pub. Date: Feb. 25, 2021

(65) Prior Publication Data

US 2022/0182748 A1 Jun. 9, 2022

(30) Foreign Application Priority Data

Aug. 16, 2019 (CN) ......................... 201910759387.1

(51) Int. Cl.
*H04R 1/10* (2006.01)

(52) U.S. Cl.
CPC ......... *H04R 1/1025* (2013.01); *H04R 1/1016* (2013.01); *H04R 1/1041* (2013.01); *H04R 2420/07* (2013.01)

(58) Field of Classification Search
None
See application file for complete search history.

(56) References Cited

U.S. PATENT DOCUMENTS 10,067,734 B2 9/2018 Watson et al.
10,506,324 B2 * 12/2019 Minoo ................. H04R 1/1091
11,616,871 B2 * 3/2023 Kim ..................... H04R 1/1041 381/311

(Continued)

FOREIGN PATENT DOCUMENTS

CN 205081496 U 3/2016
CN 106028257 A 10/2016

(Continued)

OTHER PUBLICATIONS

International Search Report, English translation, from PCT/CN2019/107898 filed Sep. 25, 2019, dated May 20, 2020.

(Continued)

*Primary Examiner* — Paul W Huber
(74) *Attorney, Agent, or Firm* — HAUPTMAN HAM, LLP

(57) ABSTRACT

A method and circuit for controlling an earphone, and a smart wrist-mounted device are provided. The method is applied to a wireless earphone including an earphone charging chip and an earphone Bluetooth chip. With the method, a power supply line between the earphone charging chip and the earphone Bluetooth chip remains in a connected state when it is detected that the wireless earphone is placed in the charging base, and the power supply line is disconnected when it is detected that the charging base is charging the wireless earphone to turn off the wireless earphone.

6 Claims, 5 Drawing Sheets

(56) References Cited

U.S. PATENT DOCUMENTS

| | | | | |
|---|---|---|---|---|
| 2016/0134961 | A1* | 5/2016 | Shaffer | H04R 1/105 381/74 |
| 2016/0357510 | A1 | 12/2016 | Watson et al. | |
| 2019/0075385 | A1* | 3/2019 | Lee | H04R 1/1025 |
| 2020/0195031 | A1* | 6/2020 | Weng | H02J 7/00 |
| 2021/0152912 | A1* | 5/2021 | Chawan | H04R 1/2826 |
| 2021/0274273 | A1* | 9/2021 | Chawan | A45C 11/24 |
| 2022/0174142 | A1* | 6/2022 | Kim | H04R 1/1016 |
| 2023/0224627 | A1* | 7/2023 | Honeycutt | H04R 1/1033 381/74 |

FOREIGN PATENT DOCUMENTS

| | | | |
|---|---|---|---|
| CN | 109525919 | A | 3/2019 |
| CN | 209016733 | U | 6/2019 |

OTHER PUBLICATIONS

Notification to Grant Patent Right for Invention issued in priority Chinese Application No. 201910759387.1; dated Oct. 12, 2020; 3 pgs.

* cited by examiner

CONTROL METHOD AND CIRCUIT FOR EARPHONE, AND SMART WRIST WORN DEVICE

This application is the national phase of International Patent Application No. PCT/CN2019/107898, titled "CONTROL METHOD AND CIRCUIT FOR EARPHONE, AND SMART WRIST-WORN DEVICE", filed on Sep. 25, 2019, which claims priority to Chinese Patent Application No. 201910759387.1, titled "CONTROL METHOD AND CIRCUIT FOR EARPHONE, AND SMART WRIST-WORN DEVICE", filed on Aug. 16, 2019 with the China National Intellectual Property Administration, both of which are incorporated herein by reference in their entireties.

FIELD

The present disclosure relates to a field of wireless earphones, and in particular to a method for controlling an earphone, a circuit for controlling an earphone, and a smart wrist-mounted device.

BACKGROUND

Wireless earphones are widely used due to their convenience and intelligence. At present, when a wireless earphone is used together with a charging base (for accommodating and charging the earphone), the wireless earphone is controlled to be turned off if it is detected that the wireless earphone is accommodated in the charging base, so as to save a power consumption of the earphone. In a conventional technology, generally, a to-be-detected element is provided in the charging base, and a detecting element to be used in conjunction with the to-be-detected element is provided on the wireless earphone, and it is detected whether the wireless earphone is accommodated in the charging base by detecting the to-be-detected element through the detecting element. However, while detecting the to-be-detected element on the charging base, the detecting element may also detect elements having the same properties as the to-be-detected element that are arranged on another component or product than the charging base, which may trigger an unexpected shutdown operation of the wireless earphone due to a mistaking determination that the wireless earphone is accommodated in the charging base.

Therefore, a problem to be solved urgently by those skilled in the art is how to provide a solution to solve the above technical problem.

SUMMARY

A method for controlling an earphone, a circuit for controlling an earphone, and a wrist-mounted device are provided according to the present disclosure, to remain a wireless earphone in a turned-on state when it is detected that the wireless earphone is placed in a charging base instead of turning off the wireless earphone immediately, and control the wireless earphone to be turned off when it is detected that the charging base is charging the wireless earphone, thereby avoiding mistakenly turning off the wireless earphone.

To solve the technical problems, a method for controlling an earphone is provided according to the present disclosure. The method is applied to a wireless earphone including an earphone charging chip and an earphone Bluetooth chip. The method includes steps of: remaining a power supply line between the earphone charging chip and the earphone Bluetooth chip in a connected state when it is detected that the wireless earphone is placed in the charging base, and disconnecting the power supply line when it is detected that the charging base is charging the wireless earphone to turn off the wireless earphone.

In a preferred embodiment, the method for controlling an earphone further includes: connecting the power supply line when it is detected that the wireless earphone is removed from the charging base to turn on the wireless earphone.

In a preferred embodiment, after when it is detected that the charging base is charging the wireless earphone and before disconnecting the power supply line, the method for controlling an earphone further includes: detecting whether charging for the wireless earphone is finished, where the power supply line remains in the connected state if the charging for the wireless earphone is not finished; and the step of disconnecting the power supply line is performed if the charging for the wireless earphone is finished.

In a preferred embodiment, the method for controlling an earphone further includes: acquiring a battery level of an earphone battery when the wireless earphone is being charged; and transmitting the battery level to the charging base, where the charging base stops charging the wireless earphone when the battery level reaches a preset full charge level.

In a preferred embodiment, the charging base is a wristband or a charging box.

To solve the technical problems, a circuit for controlling an earphone is further provided according to the present disclosure. The circuit is applied to a wireless earphone including an earphone charging chip and an earphone Bluetooth chip, and includes a detecting element and a control circuit. The detecting element is configured to generate a turn-off signal when it is detected that the wireless earphone is placed in a charging base. The control circuit is configured to remain a power supply line between the earphone charging chip and the earphone Bluetooth chip in a connected state when receiving the turn-off signal, and disconnect the power supply line when it is detected that the charging base is charging the wireless earphone to turn off the wireless earphone.

In a preferred embodiment, the detecting element is further configured to generate a turn-on signal when it is detected that the wireless earphone is removed from the charging base; and the control circuit is further configured to connect the power supply line when receiving the turn-on signal to turn on the wireless earphone.

In a preferred embodiment, the control circuit includes a switching chip, a main control circuit, and a mistaking triggering prevention circuit. The switching chip is arranged on the power supply line. The main control circuit is configured to: generate, when receiving the turn-on signal for the wireless earphone, an enabling signal to control the switching chip to connect the power supply line in response to the enabling signal; and stop generating the enabling signal when receiving the turn-off signal, so that the switching chip disconnects the power supply line. The mistaking triggering prevention circuit is configured to: generate, when it is detected that the turn-off signal is generated, an enabling signal to control the switching chip to remain the power supply line in the connected state in response to the enabling signal; and stop generating the enabling signal when the charging base is charging the wireless earphone.

In a preferred embodiment, the control circuit is further configured to detect whether charging for the wireless earphone is finished, where the power supply line remains in the connected state if the charging for the wireless earphone is not finished, and the power supply line is disconnected if the charging for the wireless earphone is finished.

To solve the above technical problems, a smart wrist-mounted device is further provided in the present disclosure. The smart wrist-mounted device includes a wireless earphone and a wristband. The wireless earphone includes an earphone charging chip, an earphone Bluetooth chip and the circuit for controlling an earphone as described in any of the above embodiments. The wristband is configured to accommodate and charge the wireless earphone.

In a preferred embodiment, a number of the wireless earphone included in the smart wrist-mounted device is two.

In a preferred embodiment, the wireless earphone further includes an earphone magnet, and the wristband includes a wristband Hall sensor. The wristband is further configured to charge the wireless earphone when the wristband Hall sensor detects that the wireless earphone is placed in the wristband.

In the method for controlling an earphone according to the present disclosure, by considering that there may be a mistaking detection on whether the wireless earphone is placed in the charging base, and the charging base charges the wireless earphone when the wireless earphone is placed in the charging base, on the basis of a detection result that the wireless earphone is placed in the charging base, a condition that the charging base is charging the wireless earphone is further used to indicate that the wireless earphone is placed in the charging base successfully. Based on the above, according to the present disclosure, the wireless earphone remains in a turned-on state when it is detected that the wireless earphone is placed in a charging base, instead of directly turning off the wireless earphone, and the wireless earphone is turned off when it is detected that the charging base is charging the wireless earphone, thereby avoiding mistakenly turning off the wireless earphone.

A circuit for controlling an earphone and a smart wrist-mounted device are further provided in the present disclosure, which have the same beneficial effects as the method for controlling an earphone.

BRIEF DESCRIPTION OF THE DRAWINGS

For clearer illustration of the technical solutions according to embodiments of the present disclosure or conventional technologies, hereinafter are briefly described the drawings to be applied in embodiments of the present disclosure or conventional technologies. Apparently, the drawings in the following descriptions are only some figures for the present disclosure, and other drawings may be obtained by those skilled in the art based on the provided drawings without any creative effort.

DETAILED DESCRIPTION

A core of the present disclosure is to provide a method for controlling an earphone, a circuit for controlling an earphone, and a wrist-mounted device, to remain a wireless earphone in a turned-on state when it is detected that the wireless earphone is placed in a charging base instead of turning off the wireless earphone immediately, and control the wireless earphone to be turned off when it is detected that the charging base is charging the wireless earphone, thereby avoiding mistakenly turning off the wireless earphone.

In order to make objectives, technical solutions and advantages of the embodiments of the present disclosure clearer, the technical solutions in the embodiments of the present disclosure are described clearly and completely in conjunction with the drawings in the embodiments of the disclosure hereinafter. It is apparent that the described embodiments are only some rather than all embodiments of the present disclosure. Any other embodiments obtained by those skilled in the art based on the embodiments in the present disclosure without any creative effort shall fall within the protection scope of the present disclosure.

Figure 1:
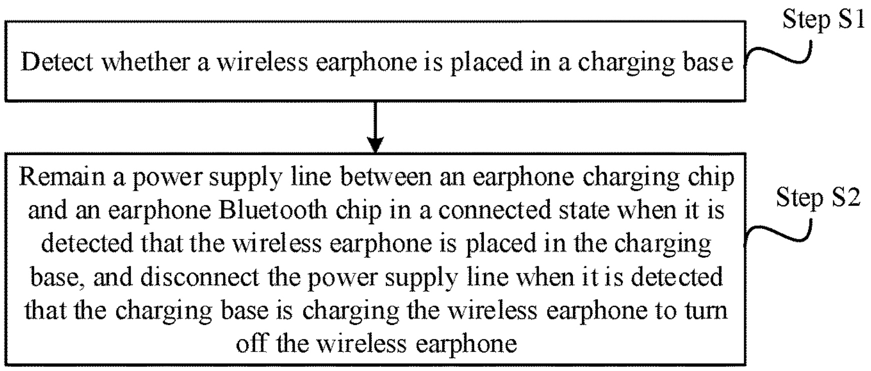
FIG. 1 is a flow chart of a method for controlling an earphone according to an embodiment of the present disclosure.

Reference is made to FIG. 1, which is a flow chart of a method for controlling an earphone according to an embodiment of the present disclosure.

The method for controlling an earphone is applied to a wireless earphone including an earphone charging chip and an earphone Bluetooth chip, and includes steps S1 to S2.

In step S1, it is detected whether the wireless earphone is placed in a charging base.

Specifically, a wireless earphone is switched into an idle state when being accommodated in the charging base, that is, a user does not use the wireless earphone at present. In view of this, a wireless earphone is autonomously turned off when being accommodated in a charging base, to save power consumption of the earphone. As can be seen, a precondition for autonomously turning-off the wireless earphone is that the wireless earphone is detected to be placed in the charging base. Therefore, according to the present disclosure, it is first detected whether the wireless earphone is placed in the charging base, as a basis for performing a subsequent operation of autonomously turning-off the wireless earphone.

In step S2, a power supply line between the earphone charging chip and the earphone Bluetooth chip remains in a connected state when it is detected that the wireless earphone is placed in the charging base, and the power supply line is disconnected when it is detected that the charging base is charging the wireless earphone to turn off the wireless earphone.

Specifically, there may be a mistaking detection on whether the wireless earphone is placed in the charging base, that is, a detection result indicates that the wireless earphone is placed in the charging base while the wireless earphone is actually not in the charging base; and the charging base charges the wireless earphone when the wireless earphone is placed in the charging base. Therefore, according to the present disclosure, whether the wireless earphone is placed in the charging base is determined based on not only a detection result of whether wireless earphone is placed in the charging base, but also a charging status of the wireless earphone. That is, on the basis of a detection result that the wireless earphone is placed in the charging base, a condition that the charging base is charging the wireless earphone is further used to indicate that the wireless earphone is placed in the charging base successfully.

Based on the above, according to the present disclosure, when it is detected that the wireless earphone is placed in a charging base, instead of directly turning off the wireless earphone, the wireless earphone remains in a turned-on state and is turned off when it is detected that the charging base is charging the wireless earphone, thereby avoiding mistakenly turning off the wireless earphone. More specifically, the wireless earphone includes an earphone charging chip and an earphone Bluetooth chip, and the wireless earphone may be turned on/off by connecting/disconnecting the power supply line between the earphone charging chip and the earphone Bluetooth chip. That is, when the power supply line is in a connected state, the Bluetooth chip is powered on and the wireless earphone is turned on. When the power supply line is in a disconnected state, the Bluetooth chip is powered off and the wireless earphone is turned off.

In the method for controlling an earphone according to the present disclosure, by considering that there may be a mistaking detection on whether the wireless earphone is placed in the charging base, and the charging base charges the wireless earphone when the wireless earphone is placed in the charging base, on the basis of a detection result that the wireless earphone is placed in the charging base, a condition that the charging base is charging the wireless earphone is further used to indicate that the wireless earphone is placed in the charging base successfully. Based on the above, according to the present disclosure, the wireless earphone remains in a turned-on state when it is detected that the wireless earphone is placed in a charging base, instead of directly turning off the wireless earphone, and the wireless earphone is turned off when it is detected that the charging base is charging the wireless earphone, thereby avoiding mistakenly turning off the wireless earphone.

Based on the above embodiment, in an embodiment, the method for controlling an earphone further includes: connecting the power supply line when it is detected that the wireless earphone is removed from the charging base, to turn on the wireless earphone.

Further, considering that a user has to remove the wireless earphone from the charging base when using the wireless earphone, and it is required to turn on the wireless earphone for normal use by the user, according to the present disclosure, the wireless earphone is autonomously turned on when being removed from the charging base, so as to be used directly by the user. As can be seen, a precondition for autonomously turning-on the wireless earphone is that the wireless earphone is detected to be removed from the charging base. Therefore, according to the present disclosure, whether the wireless earphone is removed from the charging base is detected as a basis for performing a subsequent operation of autonomously turning-on the wireless earphone.

Based on this, according to the present disclosure, the power supply line between the earphone charging chip and the earphone Bluetooth chip is connected to turn on the wireless earphone when it is detected that the wireless earphone is removed from the charging base, so that the user can directly use the wireless earphone after taking the wireless earphone out of the charging base.

In an embodiment, after when it is detected that the charging base is charging the wireless earphone, and before disconnecting the power supply line, the method for controlling an earphone further includes: detecting whether charging for the wireless earphone is finished. The power supply line remains in a connected state if the charging for the wireless earphone is not finished; and the step of disconnecting the power supply line is performed if the charging for the wireless earphone is finished.

Further, based on the above embodiment, the wireless earphone is controlled to be turned off when it is detected that the charging base is charging the wireless earphone, that is, the wireless earphone is in a turned-off state (in the turned-off state of the wireless earphone, only the earphone Bluetooth chip is turned off, and the earphone charging chip still works for charging an earphone battery) during being charged. In this case, the wireless earphone cannot interact with an external device (such as the charging base), and application of the wireless earphone is limited.

Based on this, according to the present disclosure, the wireless earphone remains in a turned-on state when it is detected that the charging base is charging the wireless earphone instead of immediately turning off the wireless earphone, and the wireless earphone is turned off when it is detected that charging for the wireless earphone is finished, thereby expanding the application of the wireless earphone during being charged.

In an embodiment, the method for controlling an earphone further includes: acquiring a battery level of an earphone battery when the wireless earphone is being charged; and transmitting the battery level to the charging base, where the charging base stops charging the wireless earphone when the battery level reaches a preset full charge level.

Further, preferably, the wireless earphone is stopped being charged when the battery level of the earphone reaches the preset full charge level, to avoid undercharge or overcharge. According to the present disclosure, when the wireless earphone is being charged, the battery level of the earphone is acquired in real time and reported to the charging base. After receiving the battery level of the earphone, the charging base compares the received battery level with the preset full charge level, and stops charging the wireless earphone when the battery level reaches the preset full charge level.

In an embodiment, the charging base is a wristband or charging box.

Specifically, according to the present disclosure, the charging base may be a charging box with a cover structure, or may be a portable wristband or another structure, which may be selected depending on an actual situation and is not specifically limited herein.

Figure 2:
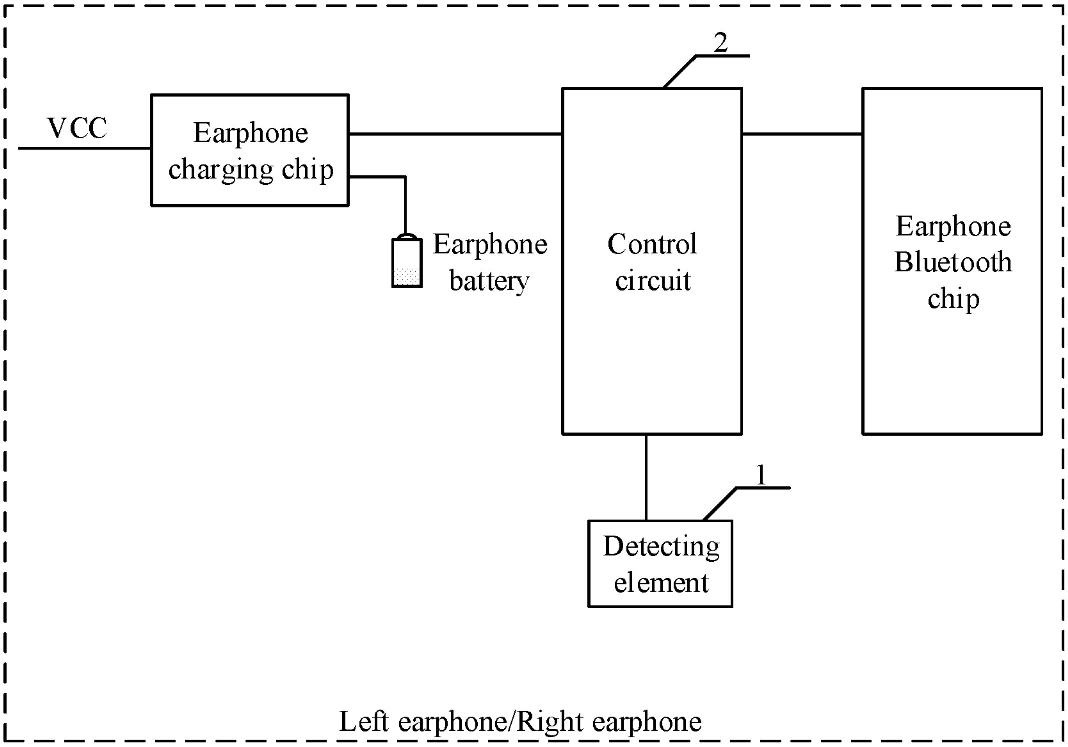
FIG. 2 is a schematic structural diagram of a wireless earphone according to an embodiment of the present disclosure.

Reference is made to FIG. 2, which is a schematic structural diagram of a wireless earphone according to an embodiment of the present disclosure.

A circuit for controlling an earphone is applied to a wireless earphone including an earphone charging chip and an earphone Bluetooth chip. The circuit includes a detecting element 1 and a control circuit 2.

The detecting element 1 is configured to generate a turn-off signal when detecting that the wireless earphone is placed in a charging base.

The control circuit 2 is configured to remain a power supply line between the earphone charging chip and the earphone Bluetooth chip in a connected state when receiving the turn-off signal, and disconnect the power supply line when it is detected that the charging base is charging the wireless earphone to turn off the wireless earphone.

Specifically, the circuit for controlling an earphone according to the present disclosure includes the detecting element 1 and the control circuit 2 connected to the detecting element 1. An operation principle of the control circuit for an earphone is described as follows.

Since the wireless earphone is required to be in a turned-off state after being placed in the charging base, according to the present disclosure, a detecting element 1 is provided in the wireless earphone to detect whether the wireless earphone is placed in the charging base. When detecting that the wireless earphone is placed in the charging base, the detecting element 1 generates a turn-off signal to be transmitted to the control circuit 2. Considering that the detecting unit 1 may perform a mistaking detection, the control circuit 2 may remain the wireless earphone in a turned-on state when receiving the turn-off signal instead of immediately turning off the wireless earphone, and control to turn off the wireless earphone when it is detected that the charging base is charging the wireless earphone, thereby avoiding mistakenly turning off the wireless earphone (for the detailed principle of this part, reference may be made to the embodiment regarding mistakenly turning off the wireless earphone in the method for controlling an earphone, which is not repeated herein).

In an embodiment, the detecting element 1 is further configured to generate a turn-on signal when detecting that the wireless earphone is removed from the charging base. The control circuit 2 is further configured to connect the power supply line when receiving the turn-on signal to turn on the wireless earphone. For the detailed principle of this embodiment, reference may be made to the embodiment regarding triggering to turn-on an earphone in the method for controlling an earphone, which is not repeated herein.

Figure 3:
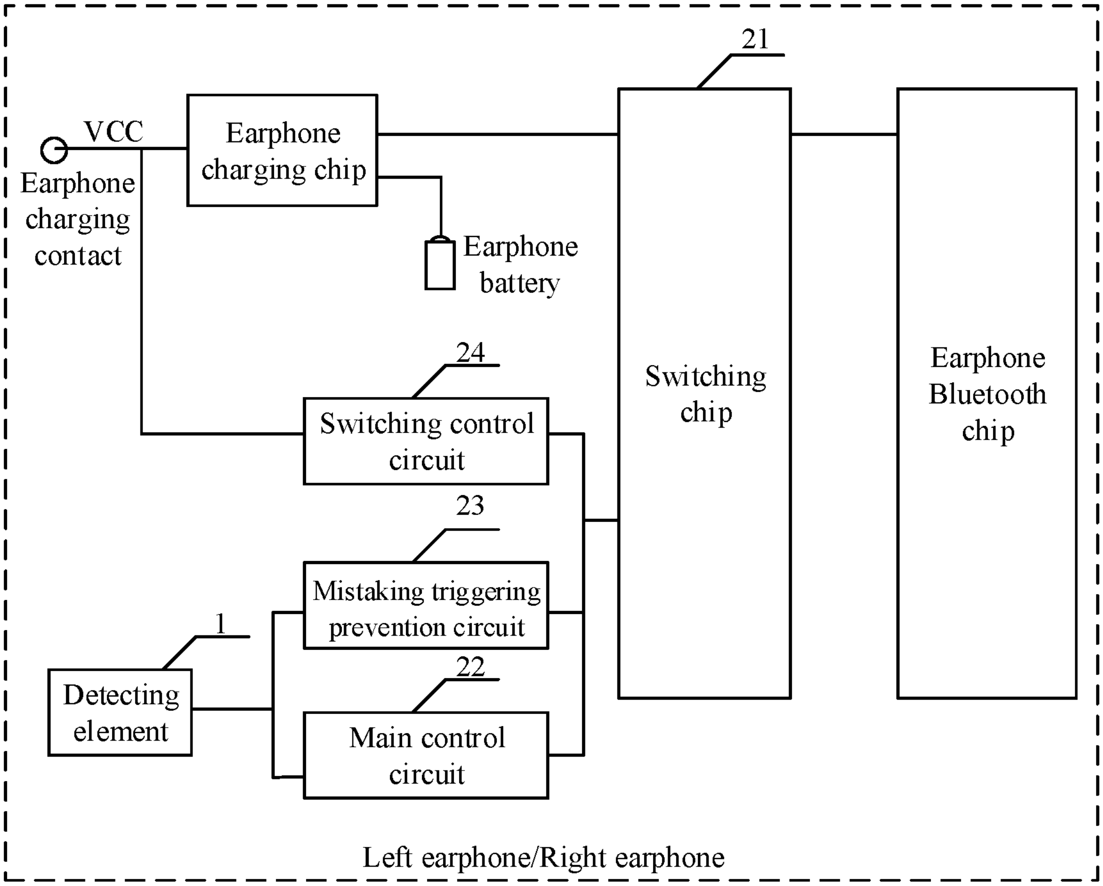
FIG. 3 is a detailed schematic structural diagram of a wireless earphone according to an embodiment of the present disclosure.

Reference is made to FIG. 3, which is a detailed schematic structural diagram of a wireless earphone according to an embodiment of the present disclosure.

In an embodiment, the control circuit 2 includes a switching chip 21, a main control circuit 22 and a mistaking triggering prevention circuit 23. The switching chip 21 is arranged on the power supply line. The main control circuit 22 is configured to: generate, when receiving a turn-on signal for the wireless earphone, an enabling signal to control the switching chip 21 to connect the power supply line in response to the enabling signal; and stop generating the enabling signal when receiving the turn-off signal, to disconnect the power supply line with the switching chip 21. The mistaking triggering prevention circuit 23 is configured to: generate, when detecting the turn-off signal is detected, an enabling signal to control the switching chip 21 to remain the power supply line in the connected state in response to the enabling signal; and stop generating the enabling signal when the charging base is charging the wireless earphone.

Specifically, the control circuit 2 according to the present disclosure includes a switching chip 21, a main control circuit 22 and a mistaking triggering prevention circuit 23, and an operation principle of the control circuit 2 is described as follows.

The switching chip 21 is arranged on the power supply line between the earphone charging chip and the earphone Bluetooth chip. The switching chip 21 is configured to connect the power supply line when receiving an enabling signal to turn on the wireless earphone, and disconnects the power supply line when failing to receive any enabling signal to turn off the wireless earphone.

The main control circuit 22 is connected to the detecting element 1 and the switching chip 21. The enabling signal outputted from the main control circuit 22 to the switching chip 21 depends on the detecting unit 1, that is, the main control circuit 22 generates the enabling signal to the switching chip 21 when receiving a turn-on signal output from the detecting element 1, to turn on the wireless earphone, and the main control circuit 22 stops generating the enabling signal to the switching chip 21 when receiving a turn-off signal outputted from the detecting element 1, to turn off the wireless earphone.

The mistaking triggering prevention circuit 23 is connected to the detecting element 1 and the switching chip 21, and is configured to remain the wireless earphone in a turned-on state when the detecting element 1 detects that the wireless earphone is placed in the charging base, and control the wireless earphone to be turned off when it is detected that the charging base is charging the wireless earphone. Specifically, the mistaking triggering prevention circuit 23 generates an enabling signal to be transmitted to the switching chip 21 when a turn-off signal is detected, to control the switching chip 21 to remain the power supply line in the connected state when receiving the enabling signal, so as to remain the wireless earphone in a turned-on state. The mistaking triggering prevention circuit 23 stops generating the enabling signal to be transmitted to the switching chip 21 when the charging base is charging the wireless earphone, so that the switching chip 21 disconnects the power supply line and the wireless earphone is turned off.

In an embodiment, the control circuit 2 is further configured to detect whether charging for the wireless earphone is finished. The power supply line remains in the connected state if the charging for the wireless earphone is not finished, and the power supply line is disconnected if the charging for the wireless earphone is finished.

Specifically, the function of this embodiment is implemented by a switching control circuit 24 shown in FIG. 3 based on a control circuit structure including the switching chip 21. The switching control circuit 24 is configured to detect whether the charging for the wireless earphone is finished. If the charging for the wireless earphone is not finished, the switching control circuit 24 generates an enabling signal to control the switching chip 21 to continually connect the power supply line when receiving the enabling signal. If the charging for the wireless earphone is finished, the switching control circuit 24 stops generating the enabling signal, so that the switching chip 21 disconnects the power supply line.

A detailed operation principle of the switching control circuit 24 is described as follows. The enabling signal outputted from the switching control circuit 24 to the switching chip 21 depends on a charging status of the wireless earphone. That is, when the wireless earphone is being charged, the switching control circuit 24 detects whether the charging for the wireless earphone is finished. If the charging for the wireless earphone is not finished, the switching control circuit 24 generates an enabling signal to be transmitted to the switching chip 21 to control the switching chip 21 to continually connect the power supply line when receiving the enabling signal, so that the wireless earphone remains in a turned-on state when being placed in the charging base. If the charging for the wireless earphone is finished, the switching control circuit 24 stops generating the enabling signal to be transmitted to the switching chip 21, so that the switching chip 21 disconnects the power supply line and the wireless earphone is turned off when the charging is finished.

Specifically, the switching control circuit 24 may be connected to an earphone charging contact. The switching control circuit 24 may determine that the charging base starts charging the earphone when detecting that the earphone charging contact is powered on, and determine that the charging base stops charging the earphone when detecting that the earphone charging contact is powered off.

Figure 4:
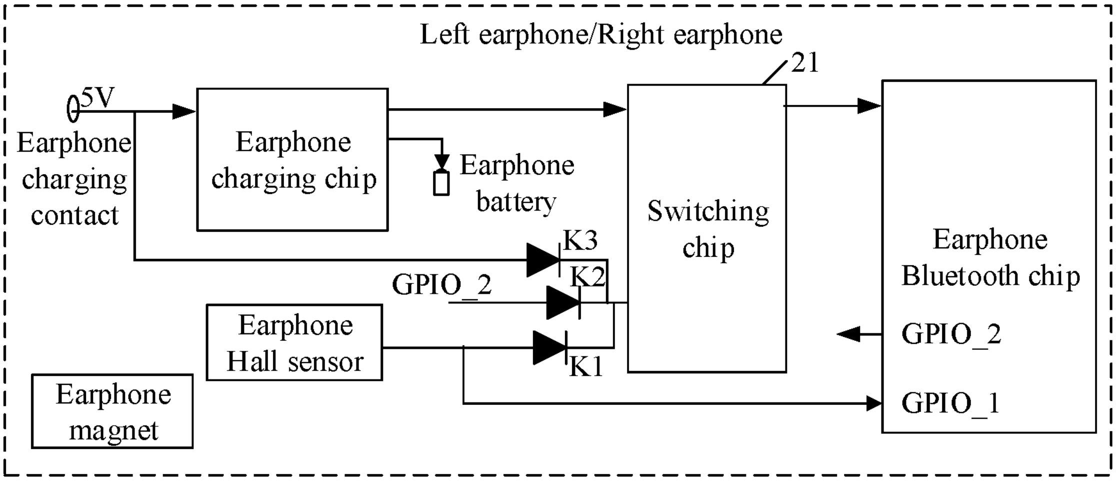
FIG. 4 is a detailed schematic structural diagram of a wireless earphone according to another embodiment of the present disclosure.

Reference is made to FIG. 4, which is a detailed schematic structural diagram of a wireless earphone according to another embodiment of the present disclosure.

Based on the above embodiment, the switching chip 21 may connect the power supply line when receiving a high level signal to turn on the wireless earphone, and disconnect the power supply line when receiving a low level signal to turn off the wireless earphone. In other words, each enabling signal mention in the above embodiments is a high level signal, and the stopping generating the enabling signal refers to generating a low level signal.

Correspondingly, according to the present disclosure, the main control circuit 22 may include a first switching device K1. An input terminal of the first switching device K1 is connected to the detecting element 1, and an output terminal of the first switching device K1 is connected to the switching chip 21. The first switching device K1 is configured to: switch on when a high level signal is inputted to the input terminal, and output a high level signal from the output terminal; and switch off when a low level signal is inputted to the input terminal, and output a low level signal from the output terminal. Specifically, the detecting element 1 generates a high level signal (in FIG. 4, GPIO_1 represents a level signal outputted from the detecting element 1) to be transmitted to the first switching device K1 when detecting that the wireless earphone is removed from the charging base. The switching device K1 is switched on and outputs a high level signal to the switching chip 21 to turn on the wireless earphone. On the other hand, the detecting element 1 generates a low level signal to be transmitted to the first switching device K1 when detecting that the wireless earphone is placed in the charging base. The first switching device K1 is switched off, that is, the output terminal of the first switching device K1 outputs a low level signal to the switching chip 21, so that the wireless earphone is turned off.

According to the present disclosure, the mistaking triggering prevention circuit 23 may include a detecting chip and a second switching device K2. The detecting chip is configured to generate a high level signal when detecting that a turn-off signal is outputted instead of a turn-on signal, and generate a low level signal when detecting that the charging base is charging the earphone battery. An input terminal of the second switching device K2 is connected to the detecting element, and an output terminal of the second switching device K2 is connected to the switching chip 21. The second switching device K2 is configured to: switch on when a high level signal is inputted to the input terminal, and output a high level signal from the output terminal; and switch off when a low level signal is inputted to the input terminal, and output a low level signal from the output terminal. Specifically, when detecting that the turn-off signal is outputted from the detecting element 1 instead of the turn-on signal, the detecting chip generates a high level signal to be transmitted to the second switching device K2, so that the second switching device K2 is switched on to output a high level signal to the switching chip 21, to remain the wireless earphone in a turned-on state. As can be seen, with the high level signal outputted from the second switching device K2, the wireless earphone can be avoided from being turned off due to mistaking detection of the detecting element 1. When detecting that the charging base is charging the earphone battery, the detecting chip generates a low level signal to be transmitted to the second switching device K2, so that the second switching device K2 is switched off. That is, the output terminal of the second switching device K2 outputs a low level signal to the switching chip 21, which has no effect on the turn-off operation of the wireless earphone when charging is finished. Further, the detecting chip according to the present disclosure may be integrated in the earphone Bluetooth chip (in FIG. 4, GPIO_2 represents a level signal outputted from the detecting chip). In other words, the earphone Bluetooth chip is improved to have a function of the detecting chip. In this case, the detecting chip detects that the charging base is charging the earphone battery according to the following principle. The earphone Bluetooth chip is powered by the earphone battery (which generally has a voltage of 4.2 V) before the earphone is placed in the charging base, and is powered constantly by a charging voltage (5V, generally) provided from the charging base after the earphone is placed in the charging base, therefore, the earphone Bluetooth chip may determine whether the charging base is charging the earphone battery based on a voltage signal inputted to its power terminal.

According to the present disclosure, the switching control circuit 24 may include a third switching device K3. An input terminal of the third switching device K3 is connected to an earphone charging contact, and an output terminal of the third switching device K3 is connected to the switching chip 21. The third switching device K3 is configured to: switch on when a high level signal is inputted to the input terminal, and output a high level signal from the output terminal; and switch off when a low level signal is inputted to the input terminal, and output a low level signal from the output terminal. Specifically, when the charging base is charging the wireless earphone, the earphone charging contact outputs a charging voltage (for example, a high level signal with a voltage of 5V) to the earphone charging chip, to charge the earphone battery through the earphone charging chip. When the charging base stops charging the wireless earphone, the earphone charging contact stops outputting the charging voltage (that is, the earphone charging contact outputs a low level signal with a voltage of 0V) to the earphone charging chip, to stop charging the earphone battery. Based on this, when the charging base is charging the wireless earphone, the earphone charging contact outputs a high level signal to the third switching device K3, and the third switching device K3 is switched on and outputs a high level signal to the switching chip 21, so that the wireless earphone remains in a turned-on state while being charged. When the charging base finishes charging the wireless earphone, the earphone charging contact outputs a low level signal to the third switching device K3, and the third switching device K3 is switched off, which is regarded as outputting a low level signal to the switching chip 21, so that the wireless earphone is turned off when charging is finished. It should be noted that, without the high level signal outputted from the second switching device K2, the wireless earphone may be turned off after being placed in the charging base and before the earphone charging contact is powered on. Therefore, due to the high level signal outputted from the second switching device K2, the wireless earphone is prevented from a process of being powered off and then powered on when being placed in the charging base, thereby effectively increasing an operation time of the charging base. Moreover, the first switching device K1, the second switching device K2 and the third switching device K3 may function to prevent signal backflow.

Further, each of the first switching device K1, the second switching device K2 and the third switching device K3 may include a diode (as shown in FIG. 4) or a switching transistor which is switched on when a high level signal is inputted to a control terminal of the switching transistor and is switched off when a low level signal is inputted to the control terminal of the switching transistor.

Specifically, an anode of the diode serves as an input of any one of the first switching device K1, the second switching device K2 and the third switching device K3, and a cathode of the diode serves as an output of any one of the first switching device K1, the second switching device K2 and the third switching device K3.

Alternatively, a control terminal of the switching transistor serves as an input of any one of the first switching device K1, the second switching device K2 and the third switching device K3, a first terminal of the switching transistor is connected to a DC power supply, and a second terminal of the switching transistor serves as an output of any one of the first switching device K1, the second switching device K2 and the third switching device K3 (when the switching transistor is switched on, a high level signal from the DC power supply is outputted from the second terminal of the switching transistor).

In addition, the charging base according to the present disclosure includes a base magnet, and the detecting element 1 is an earphone Hall sensor (as shown in FIG. 4). The earphone Hall sensor determines that the wireless earphone is removed from the charging base when detecting that a first magnetic field intensity generated by the base magnet is less than a threshold, and determines that the wireless earphone is placed in the charging base when detecting that the first magnetic field intensity is greater than the threshold. In this case, a mistaking detection of the detecting element 1 may be caused by that the earphone Hall sensor is triggered when the wireless earphone is close to another magnet other than the base magnet. Therefore, a design for preventing mistaking triggering is required.

In another embodiment, the detecting element 1 of the present disclosure may be an infrared sensor (including an infrared emitting element and an infrared receiving element). It may be understood that a to-be-detected element on the charging base is arranged in the body of the charging base. When the wireless earphone is placed in the charging base, the infrared sensor may receive a reflected infrared signal and it is determined that the wireless earphone is placed in the charging base. When the wireless earphone is removed from the charging base, the infrared sensor receives no reflected infrared signal and it is determined that the wireless earphone is removed from the charging base. In this case, a mistaking detection of the detecting element 1 may be caused by that when the wireless earphone is placed on another component or product other than the charging base, the infrared sensor may also receive a reflected infrared signal and it may be mistakenly determined that the wireless earphone is placed in the charging base.

A smart wrist-mounted device is further provided in the present disclosure, including a wireless earphone and a wristband. The wireless earphone includes an earphone charging chip, an earphone Bluetooth chip and the circuit for controlling an earphone as described in any of the above embodiments. The wristband is configured to accommodate and charge the wireless earphone. For description of the smart wrist-mounted device in this embodiment, reference may be made to the embodiment regarding the circuit for controlling an earphone, which is not repeated herein.

Figure 5:
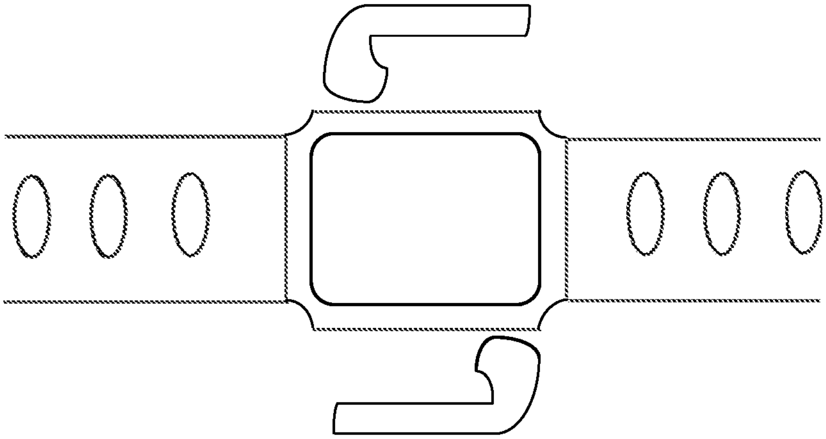
FIG. 5 is a schematic diagram showing an appearance of a smart wrist-mounted device according to an embodiment of the present disclosure.

In an embodiment, the number of the wireless earphone included in the smart wrist-mounted device is two. Specifically, a wristband of the smart wrist-mounted device may be configured to accommodate and charge the two wireless earphones (including a left earphone and a right earphone), as shown in FIG. 5. The wristband may be also configured to accommodate and charge a single wireless earphone.

In an embodiment, the wireless earphone further includes an earphone magnet, and the wristband includes a wristband Hall sensor. The wristband is further configured to charge the wireless earphone when the wristband Hall sensor detects that the wireless earphone is placed in the wristband.

Figure 6:
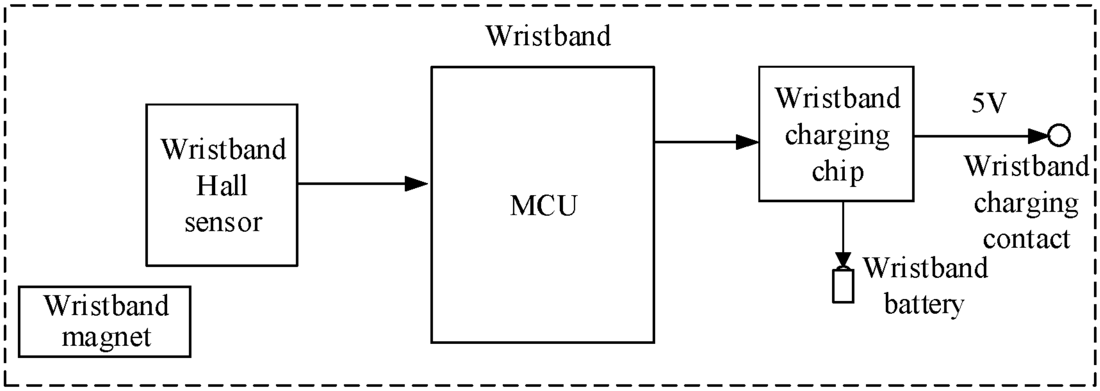
FIG. 6 is a schematic structural diagram of a wristband according to an embodiment of the present disclosure.

Further, the wireless earphone according to the present disclosure includes an earphone magnet (as shown in FIG. 4, in this case mistaking triggering of the detecting element 1 may be caused when two wireless earphones are placed together), and the wristband includes a wristband Hall sensor (as shown in FIG. 6). Similarly, the wristband Hall sensor determines that the wireless earphone is removed from the wristband when detecting that a second magnetic field intensity generated by the earphone magnet is less than a threshold, and determines that the wireless earphone is placed in the wristband when detecting that the second magnetic field intensity is greater than the threshold. The wristband charges the wireless earphone when the wireless earphone is placed in the wristband. The wristband may use an infrared sensor for detecting whether the wireless earphone is placed in the wristband.

More specifically, as shown in FIG. 6, the wristband further includes a controller (such as a Microcontroller Unit (MCU)), a wristband charging chip, a wristband battery, and a wristband charging contact. When the wireless earphone is placed in the wristband, the wristband charging contact is connected with the earphone charging contact. In this case, the controller receives, from the wristband Hall sensor, a signal indicating that the wireless earphone is placed in the wristband, and controls the wristband charging chip to obtain power from the wristband battery and supplies the power to the wireless earphone through the earphone charging contact.

In addition, the wristband according to the present disclosure may further include a wristband Bluetooth chip to be connected with the earphone Bluetooth chip when the wireless earphone is placed in the wristband (the wristband Bluetooth chip may be integrated into the wristband controller). The earphone Bluetooth chip, when the wireless earphone is being charged, is further connected to the earphone battery to acquire a battery level of the earphone battery (the earphone Bluetooth chip may also accurately measure a battery level of the earphone battery by using a voltmeter) and transmit the battery level of the earphone battery to the wristband Bluetooth chip, so that the wristband stops charging the wireless earphone when the battery level of the earphone battery reaches a preset full charge level.

It should be noted that the wireless earphone in the present disclosure may be, but is not limited to, a True Wireless Stereo (TWS) earphone or a common Bluetooth earphone. A wrist-mounted device with the TWS earphone operates based on principles as follows. 1) A power supply line between an earphone charging chip and an earphone Bluetooth chip in the TWS earphone remains in a connected state when it is detected that the TWS earphone is placed in the wristband, and power supply line is disconnected when it is detected that the wristband is charging the TWS earphone to turn off the TWS earphone. 2) When it is detected that the TWS earphone is removed from the wristband, the power supply line is connected to turn on the TWS earphone. 3) When it is detected that the wristband is charging the TWS earphone, and before disconnecting the power supply line, it may be further detected whether charging for the TWS earphone is finished. The power supply line remains in a connected state if the charging for the TWS earphone is not finished. The step of disconnecting the power supply line is performed if the charging for the TWS earphone is finished. 4) A battery level of the earphone battery is acquired when the TWS earphone is being charged. The battery level of the earphone battery is transmitted to the wristband, so that the wristband stops charging the TWS earphone when the battery level of the earphone battery reaches a preset full charge level.

It is further noted that relational terms such as "first", "second" and the like are merely used herein to distinguish one entity or operation from another, rather than to necessitate or imply an actual relationship or order of these entities or operations. Furthermore, terms "include", "comprise" or any other variants thereof are intended to be non-exclusive. Therefore, a process, method, article or device including a series of elements includes not only the elements but also other elements that are not enumerated or other elements inherent to such process, method, article or device. Unless expressively limited otherwise, a process, method, article or device limited by "comprising/including a(n) . . . " does not exclude existence of another identical element in such process, method, article or device.

Those skilled in the art can implement or practice the present disclosure based on the above description of the disclosed embodiments. Various modifications to the embodiments are apparent for the skilled in the art. The general principle defined herein may be implemented in other embodiments without departing from the spirit or scope of the present disclosure. Therefore, the present disclosure should not be limited to the embodiments disclosed herein, but has the widest scope in accordance to the principle and the novel features disclosed herein.

What is claimed is:

1. A circuit for controlling an earphone, wherein the circuit is applied to a wireless earphone comprising an earphone charging chip and an earphone Bluetooth chip, and the circuit comprises:

a detecting element configured to generate a turn-off signal in response to detecting that the wireless earphone is placed in a charging base;

a control circuit configured to remain a power supply line between the earphone charging chip and the earphone Bluetooth chip in a connected state in response to receiving the turn-off signal, and disconnect the power supply line in response to the charging base charging the wireless earphone to turn off the wireless earphone, a switching chip arranged on the power supply line;

a main control circuit configured to generate, in response to receiving a turn-on signal for the wireless earphone, an enabling signal to control the switching chip to connect the power supply line in response to the enabling signal; and stop generating the enabling signal in response to receiving the turn-off signal, to disconnect the power supply line with the switching chip; and a mistaking triggering prevention circuit configured to generate, in response to detecting the turn-off signal, an enabling signal to control the switching chip to remain the power supply line in the connected state; and stop generating the enabling signal in response to that the charging base is charging the wireless earphone.

2. The circuit for controlling an earphone according to claim 1, wherein the detecting element is further configured to generate a turn-on signal in response to detecting that the wireless earphone is removed from the charging base; and the control circuit is further configured to connect the power supply line in response to receiving the turn-on signal, to turn on the wireless earphone.

3. The circuit for controlling an earphone according to claim 1, wherein the control circuit is further configured to detect whether charging for the wireless earphone is finished, wherein the power supply line remains in the connected state in response to the charging for the wireless earphone being not finished, and the power supply line is disconnected in response to the charging for the wireless earphone being finished.

4. A smart wrist-mounted device, comprising: a wireless earphone, and a wristband wherein the wireless earphone comprises an earphone charging chip, an earphone Bluetooth chip and the circuit for controlling the earphone according to claim 1.

5. The smart wrist-mounted device according to claim 4, wherein a number of the wireless earphone comprised in the smart wrist-mounted device is two.

6. The smart wrist-mounted device according to claim 4, wherein the wireless earphone further comprises an earphone magnet, and the wristband comprises a wristband Hall sensor, wherein the wristband is further configured to charge the wireless earphone in response to the wristband Hall sensor detecting that the wireless earphone is placed in the wristband.

* * * * *